United States Patent
Khachaturian et al.

(10) Patent No.: US 11,415,822 B2
(45) Date of Patent: Aug. 16, 2022

(54) CAPACITIVE MODULATORS FOR HIGH-EFFICIENCY ELECTRO-OPTICAL SYSTEMS

(71) Applicant: California Institute of Technology, Pasadena, CA (US)

(72) Inventors: Aroutin Khachaturian, Glendale, CA (US); Seyed Mohammadreza Fatemi, Pasadena, CA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 246 days.

(21) Appl. No.: 16/275,224

(22) Filed: Feb. 13, 2019

(65) Prior Publication Data
US 2019/0293973 A1 Sep. 26, 2019

Related U.S. Application Data

(60) Provisional application No. 62/630,136, filed on Feb. 13, 2018.

(51) Int. Cl.
*G02F 1/061* (2006.01)
*G02F 1/015* (2006.01)

(52) U.S. Cl.
CPC .............. *G02F 1/061* (2013.01); *G02F 1/015* (2013.01); *G02F 1/0151* (2021.01); *G02F 2203/50* (2013.01)

(58) Field of Classification Search
CPC .... G02F 1/0018; G02F 1/0305; G02F 1/0316; G02F 1/0338; G02F 1/035; G02F 1/061; G02F 1/065; G02F 1/07; G02F 1/073; G02F 1/076; G02F 1/0311; G02F 1/015; G02F 1/0151; G02F 2203/50

See application file for complete search history.

(56) References Cited

U.S. PATENT DOCUMENTS

| | | | | |
|---|---|---|---|---|
| 6,154,432 A * | 11/2000 | Faruqi | ................. | G11B 7/0033 369/103 |
| 2010/0040322 A1* | 2/2010 | Li | ........................... | G02F 1/065 385/3 |
| 2012/0163749 A1* | 6/2012 | Huang | .................... | G02F 1/225 385/3 |
| 2018/0074349 A1* | 3/2018 | Fujikata | ................. | G02F 1/025 |

\* cited by examiner

*Primary Examiner* — Joseph P Martinez
*Assistant Examiner* — Vipin Patel
(74) *Attorney, Agent, or Firm* — Weaver Austin Villeneuve & Sampson LLP

(57) ABSTRACT

An electro-optical includes, in part, a multitude of phase modulators each of which includes, in part, a p-type semiconductor region, an n-type semiconductor region, and a $\chi^{(2)}$ insulating dielectric material disposed between the p-type and n-type semiconductor regions. The electro-optical device may be a phased array in which each phase modulator is associated with a different one of the transmitting elements of the phased array. The $\chi^{(2)}$ insulating dielectric material may be an organic polymer. The electro-optical device may further include, in part, a multitude of sensors each associated with a different one of the phase modulators. Each sensor is adapted to receive a phase modulated signal generated by the sensor's associated phase modulator. The electro-optical device may further include, in part, a multitude of amplitude modulators each associated with a different one of the multitude of phase modulators.

13 Claims, 6 Drawing Sheets

CAPACITIVE MODULATORS FOR HIGH-EFFICIENCY ELECTRO-OPTICAL SYSTEMS

CROSS REFERENCE TO RELATED APPLICATIONS

The present application claims benefit under 35 USC 119(e) of U.S. Application Ser. No. 62/630,136 filed Feb. 13, 2018, the content of which is incorporated herein by reference in its entirety.

FIELD OF THE INVENTION

The present invention is related to electro-optical systems, and more particularly to modulating the phase of optical signals in such systems.

BACKGROUND OF THE INVENTION

Optical phased arrays have a wide range of applications such as free-space data communications, LIDAR ranging and velocimetry, coherent imaging, integrated adaptive optics, holographic projection and recording, lens-less projection, and lens-less displays. Integrated phased arrays allow the manipulation of optical wave fronts using integrated phase and amplitude modulators in a compact form factor.

For scalable nano-photonics integrated systems it is crucial to reduce the total power consumption of the system. If the phase shifters of an optical phased array consume relatively high DC power for operation, the delivery of the required power to the chip and the dissipation of the excess power in the form of heat will hinder the realization of an optical phased array with a large number of elements.

Furthermore, in data communication links (free-space optical point to point communications or fiber optics communications) it is important to reduce the total power consumption of the optical link. Resonance based data modulation schemes such as integrated ring resonators consume more power for resonance wavelength tuning compared to interferometric and absorption based devices that require no such tuning but have lower voltage drive requirements. The resonance wavelength adjustment is achieved using thermal heaters to shift the resonance of the ring. These thermal phase modulators thus consume static DC power.

BRIEF SUMMARY OF THE INVENTION

An electro-optical device, in accordance with one embodiment of the present invention, includes, in part, a multitude of phase modulators each of which includes, in part, a p-type semiconductor region, an n-type semiconductor region, and a $\chi^{(2)}$ insulating dielectric material disposed between the p-type and n-type semiconductor regions. In one embodiment, the electro-optical device is a phased array in which each phase modulator is associated with a different one of the transmitting elements of the phased array. In one embodiment, the $\chi^{(2)}$ insulating dielectric material is an organic polymer.

In one embodiment, the electro-optical device further includes, in part, a multitude of sensors each associated with a different one of the phase modulators. Each sensor is adapted to receive a phase modulated signal generated by the sensor's associated phase modulator.

In one embodiment, the electro-optical device further includes, in part, a multitude of amplitude modulators each associated with a different one of the multitude of phase modulators. In one embodiment, the phase modulators form an array which may be a one-dimensional or a two dimensional array.

An electro-optical device, in accordance with one embodiment of the present invention, includes, in part, a multitude of phase modulators each of which includes, in part, a p-type semiconductor region, an n-type semiconductor region, an undoped semiconductor region disposed between the n-type and p-type semiconductor regions, and a $\chi^{(2)}$ insulating dielectric material overlying the undoped semiconductor region and extending above the p-type and n-type semiconductor regions. In one embodiment, the $\chi^{(2)}$ insulating dielectric material is an organic polymer.

In one embodiment, the electro-optical device is a phased array in which each phase modulator is associated with a different one of a multitude of transmitting elements of the phased array. In one embodiment, the electro-optical device further includes, in part, a multitude of sensors each associated with a different one of the multitude of phase modulators. Each sensor is adapted to receive a phase modulated signal generated by the sensor's associated phase modulator.

In one embodiment, the electro-optical device further includes, in part, a multitude of amplitude modulators each associated with a different one of the multitude of phase modulators. In one embodiment, the phase modulators form an array which may be a one-dimensional or a two dimensional array.

DETAILED DESCRIPTION OF THE INVENTION

An electro-optical system, in accordance with one embodiment of the present invention, includes, in part, capacitive phase modulators to substantially eliminate its static DC power consumption and thus reduce its overall power consumption.

Figure 1:
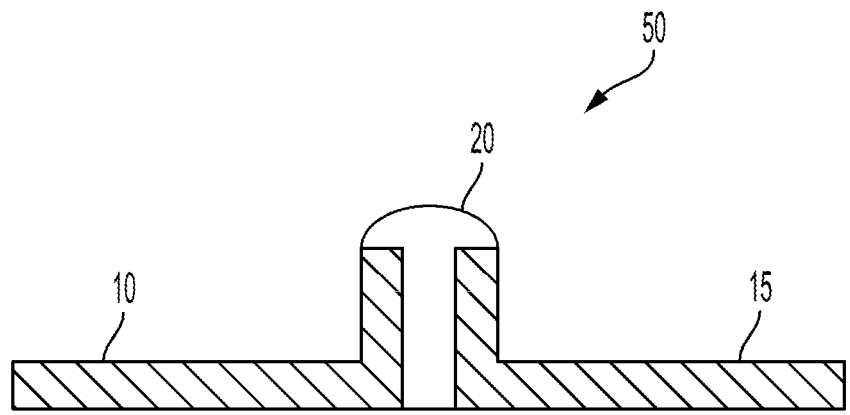
FIG. 1 shows a capacitive element that may be used as a phase modulator, in accordance with one exemplary embodiment of the present invention.

FIG. 1 shows a capacitor 50 that may be used as a capacitive phase modulator, in accordance with one exemplary embodiment of the present invention. Capacitive phase modulator 50 is shown as including, in part, a p-type semiconductor (assumed to be silicon in the following description) region 10, an n-type silicon region 15, and a $\chi^{(2)}$ insulating dielectric material 20 disposed between the p-type region 10 and n-type region 15. In one embodiment, $\chi^{(2)}$ insulating dielectric 20 may be an organic polymer material such as various chromophores like YLD-124 and JRD1.

Figure 2:
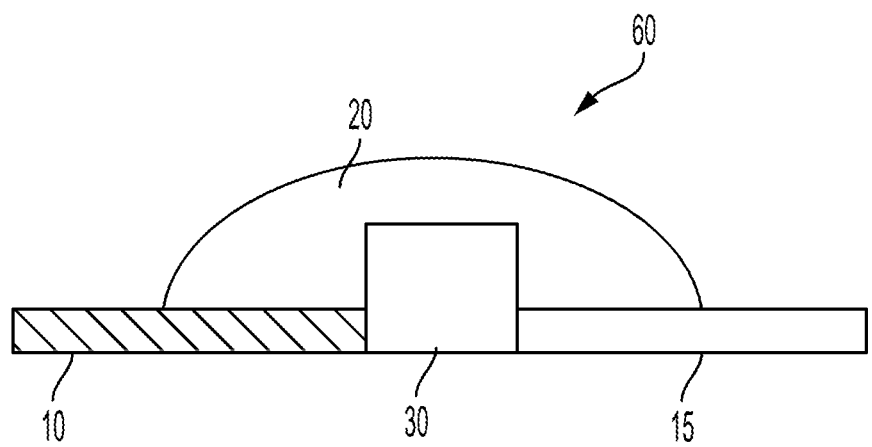
FIG. 2 shows a capacitive element that may be used as a phase modulator, in accordance with one exemplary embodiment of the present invention.

FIG. 2 shows a capacitor 60 that may be used as a capacitive phase modulator, in accordance with another exemplary embodiment of the present invention. Capacitive phase modulator 60 is shown as including, in part, a p-type semiconductor (assumed to be silicon in the following description) region 10, an n-type silicon region 15, an undoped silicon region 30, and a $\chi^{(2)}$ insulating dielectric material covering the undoped region 30 and parts of p-type region 10 and n-type region and 15.

The performance and characteristics of a phase and or amplitude modulator in an integrated electro-optical system, such as a phased array, has an impact on the overall performance of the system. Using a $\chi^{(2)}$ insulating dielectric material in an optical phase modulator provides a number of advantages. For example, linear electro-optical modulators using a $\chi^{(2)}$ insulating dielectric material have low insertion loss. Furthermore, they have a relatively high bandwidth and thus can be used for making electro-optical systems that require fast modulation speed without additional loss. Moreover, a $\chi^{(2)}$ insulating dielectric material has a relatively high electro-optical modulation efficiency and therefore benefits from a small and compact form factor, thereby reducing the silicon area and thus the cost of the electro-optical system.

Figure 3A:
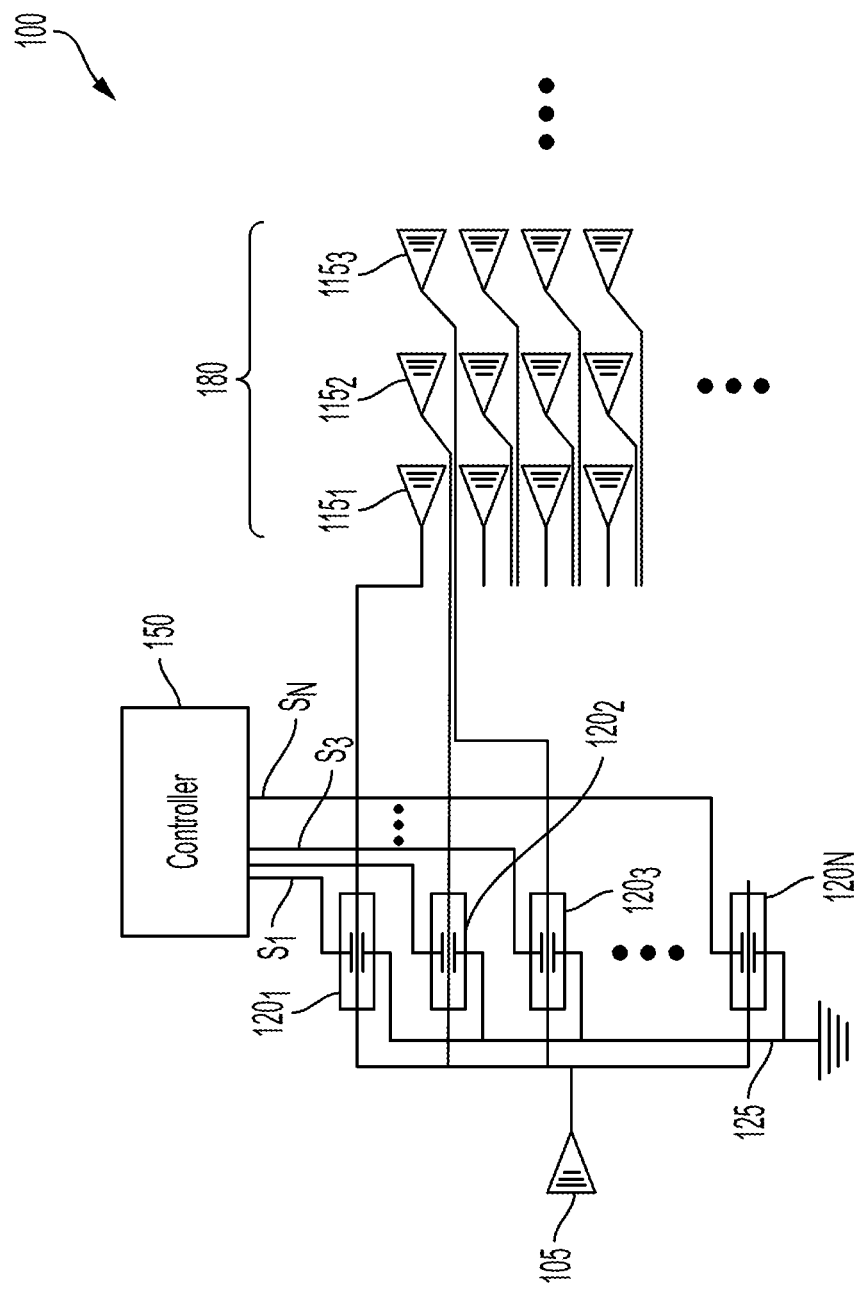
FIG. 3A is a simplified high-level block diagram of a phased array that includes capacitive phase modulation, in accordance with one exemplary embodiment of the present invention.

FIG. 3A is a simplified high-level block diagram of a phased array 100 that includes capacitive phase modulation, in accordance with one exemplary embodiment of the present invention. Phased array 100 is shown as including, in part, an array 180 of N transmitting elements $115_1$, $115_2$, $115_3 \ldots 115_N$ where N in an integer greater than one. Phased array 100 is also shown as including, in part, N capacitive phase modulators $120_1$, $120_2$, $120_3 \ldots 120_N$. Each capacitive phase modulator $120_i$, where i is an index ranging from 1 to N, is associated with a different one of the transmitting elements $115_i$ and modulates the phase of the signal transmitted by transmitting elements $115_i$. The optical signal generated by optical source 105 is split and delivered through N different waveguides (not shown) each associated with a different one of the capacitive phase modulator $120_i$.

As is seen from FIG. 3A, a first plate of each capacitive phase modulator $120_i$ is coupled to the ground potential. The second plate of each capacitive phase modulator $120_i$ receives a voltage signal S, controlled by controller 150. By varying the voltage applied to capacitive phase modulator $120_i$, the index of refraction of the capacitive phase modulator and therefore the phase of the optical signal travelling through the waveguide associated with the capacitive phase modulator charges. The phase modulated optical signal travelling through each waveguide is transmitted by the waveguide's associated transmit element $115_i$. Each capacitive phase modulator $120_i$ may be a capacitor 50, or capacitor 60 shown respectively in FIGS. 1 and 2.

Phased array 100 consumes substantially no static DC power and consumes power during dynamic adjustment. Since phase modulation is performed using capacitive elements, the phased array can maintain any particular configuration without consuming any power. The worst case dynamic power consumption of a phased array occurs when switching between zero applied phase (zero voltage applied and no charge stored on the capacitor) and $2\pi$ applied phase ($V_{2\pi}$ applied across the capacitor). For a phased array with N phase modulators, the worst case dynamic power that needs to be delivered to or dissipated from the chip is proportional to energy stored in the capacitor defined as:

$$\Delta U = N(U_{2\pi} - U_0) = \frac{1}{2} N C V_{2\pi}^2 \qquad (1)$$

In equation (1), $U_{2\pi}$ and $U_0$ represent the energy associated with $2\pi$ and 0 phases respectively, and C represents the capacitance of the capacitive phase modulator. Capacitors 50 and 60 provide a number of advantages because for a given length, L, capacitors 50 and 60 require a smaller voltage to achieve a $2\pi$ phase shift.

Speckle is an artifact of coherent optical imaging systems and reduces the quality of the captured image. In accordance with one embodiment of the present invention, speckle is reduced by using capacitive modulators that includes a $\chi^{(2)}$ insulating dielectric material, two exemplary embodiments of which are shown in FIGS. 1 and 2. The nonlinearities in $\chi^{(2)}$ insulating dielectric material when used in a capacitor, in accordance with embodiments of the present invention, induce phase shift at marginal additional loss. Hence, a semitransparent array of $\chi^{(2)}$ insulating dielectric material may be used to form an active diffuser by randomly changing the refractive index in front of the aperture of a phased array.

Figure 3B:
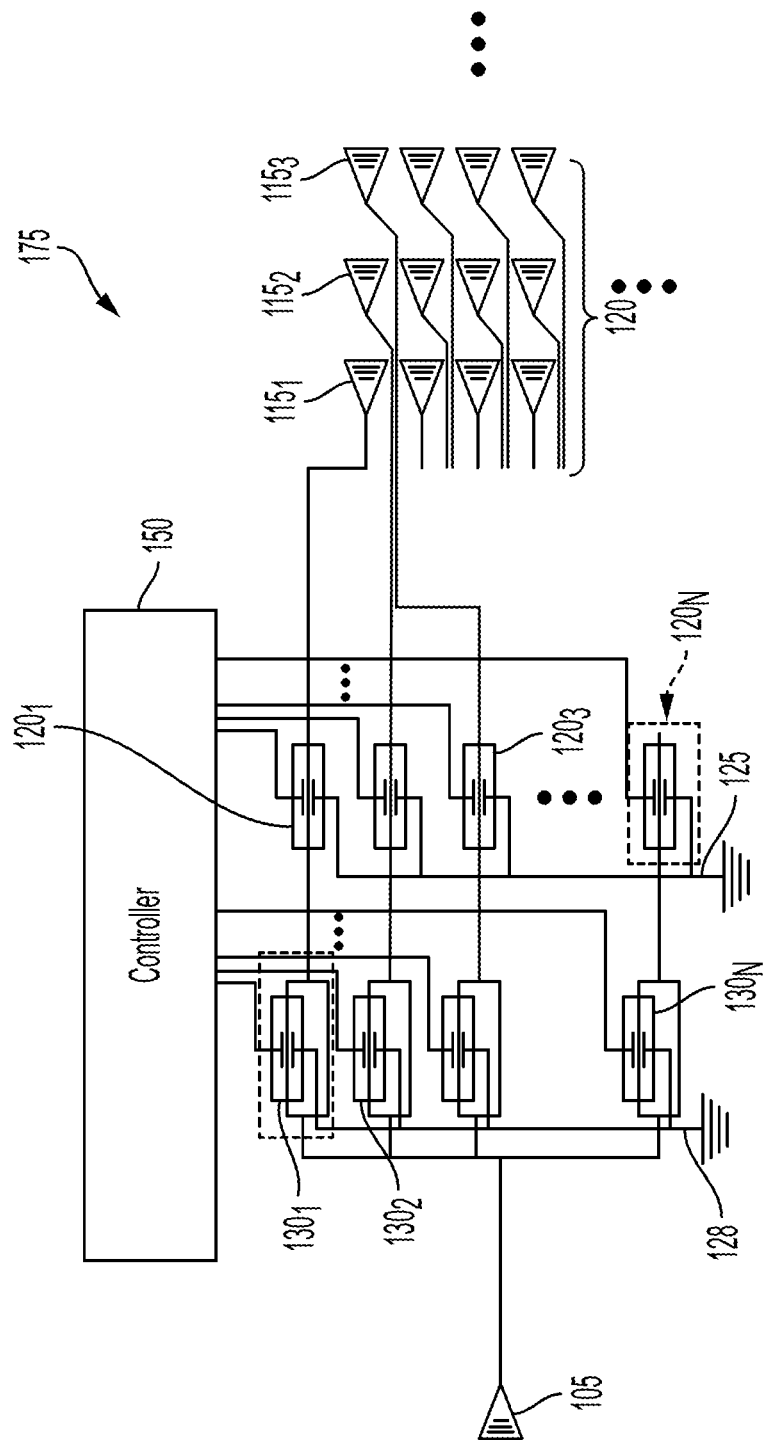
FIG. 3B is a simplified high-level block diagram of a phased array that includes capacitive amplitude and phase modulation, in accordance with one exemplary embodiment of the present invention.

FIG. 3B is a simplified high-level block diagram of a phased array 175 that includes capacitive phase and amplitude modulation, in accordance with another exemplary embodiment of the present invention. Phased array 175 is similar to phased array 100 except that phased array 175 also includes an array of amplitude modulators $130_1$, $130_2 \ldots 130_N$ that modulate the amplitude of the signals delivered to transmitting elements $115_i$. Each amplitude modulator $130_i$, which may be a Mach-Zehnder modulator, includes a capacitive element for amplitude modulations that corresponds to capacitor 50, as shown in FIG. 1, or capacitor 60 as shown in FIG. 2.

Figure 4A:
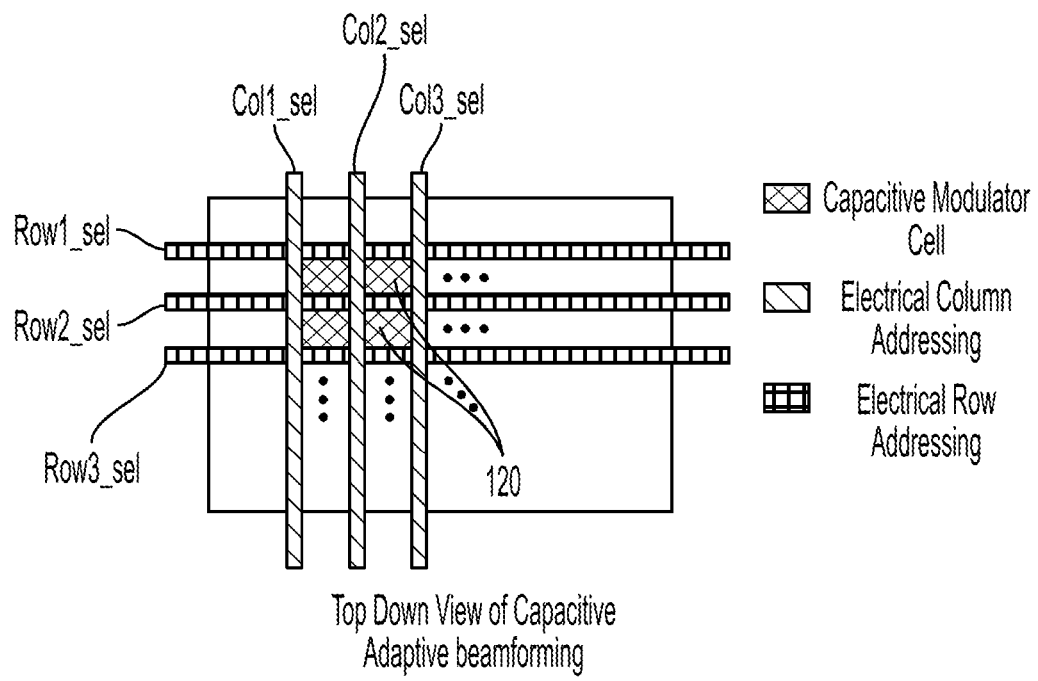
FIG. 4A is a top view of a photonic device having an array of capacitive phase modulators arranged along rows and columns, in accordance with one embodiment of the present invention.

FIG. 4A is a top view of a two-dimensional array of capacitive phase modulator pillars 120 arranged among rows and columns of electrical interconnects as used in a photonic device. The electrical interconnects allow row and column addressing of individual phase modulator pillars. The row select lines—three of which namely Row1_sel, Row2_sel and Row3_sel are shown—as well as the column select lines—three of which namely Col1_sel, Col2_sel and Col3_sel are shown—are used to select and apply a voltage across the selected capacitive phase modulator. If each column of the capacitive phase modulators can induce a $2\pi$ phase shift, then the entire capacitive modulator pillar array can introduce an arbitrary phase shift. In addition, such a device can cancel the effect of a diffuser in an imaging system and operate in a similar fashion as an adaptive optical mirror.

Due their ability to generate an arbitrary phase shift, a capacitive phase modulator, as shown in FIG. 4A, may act as a moving diffuser to reduce the effect of speckle. For a sufficiently large number of N random shifts, the signal to speckle contrast ratio will increase by a factor of $\sqrt{N}$.

Figure 4B:
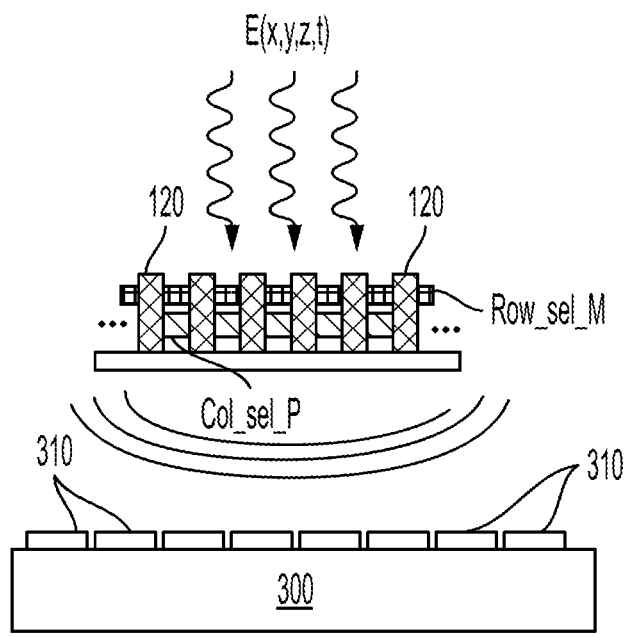
FIG. 4B is a top view of the device shown in FIG. 4A, in accordance with one exemplary embodiment of the present invention.

FIG. 4B is a top view of the array of capacitive phase modulators shown in FIG. 4A. The optical signal received by the array is phase shifted and then delivered to the sensors/receivers 310, such as camera pixels, of optical receiver device 300. Only the signal selecting row M, namely Row_sel_M and the signal selecting column P, namely Col_Sel-P are shown in FIG. 4B. Each sensor/receiver 310 may be a coherent or an incoherent sensor/receiver. In one embodiment of the coherent receiver, a reference signal is distributed using planar waveguides among various sensors/receivers. In another embodiment, the capacitive phase modulator pillars can also be co-designed with the coherent or incoherent sensor/receiver to change the sensor/receiver pattern to have more effective area/higher directivity, and the like, in addition to functioning as a phase shifter. It is understood that due to reciprocity, the waves can travel in reverse and the system can also operate as a coherent transmitter system when sensors/receivers are replaced with transmitter units.

Figure 4C:
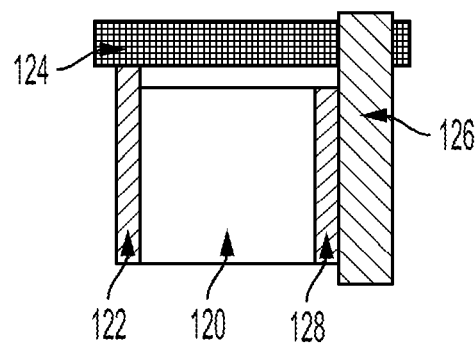
FIG. 4C is a top view of a capacitive phase modulator disposed along a row and column of interconnects, in accordance with one embodiment of the present invention.

FIG. 4C is a top view of a capacitive phase modulator 120 as shown in FIGS. 4A and 4B. Capacitive phase modulator 120 is shown as being coupled to row interconnect 124 via metal line 122, and to column interconnect 126 via metal line 128.

Figure 4D:
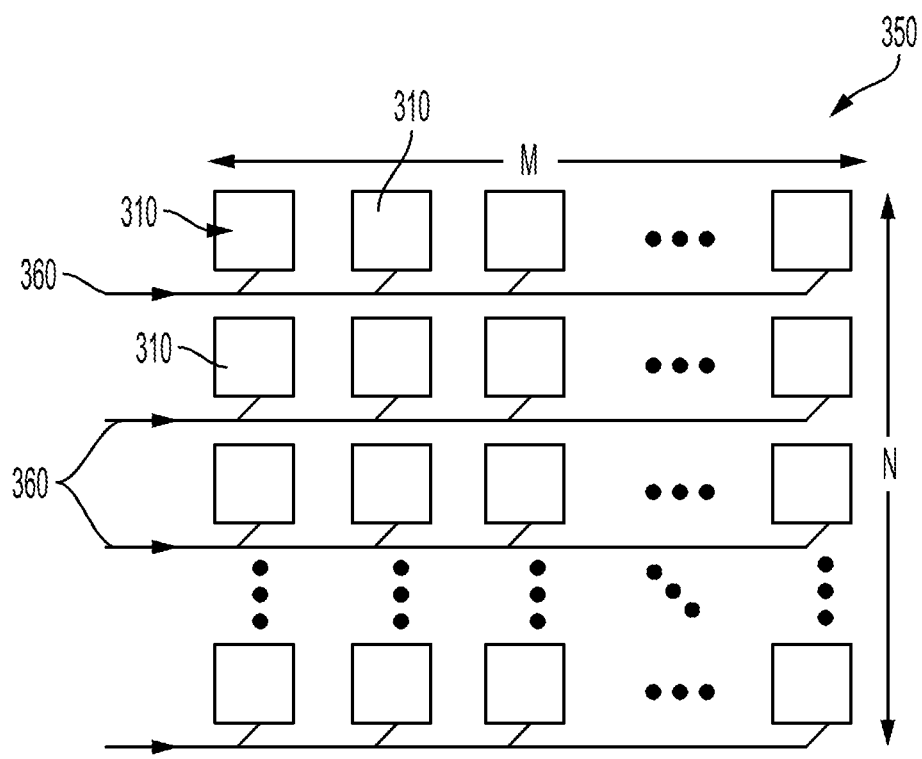
FIG. 4D shows an array of sensors/receivers disposed along multiple rows and columns, in accordance with one embodiment of the present invention.

FIG. 4D shows an array 350 of sensors/receivers 310 of device 300 also shown in FIG. 4B. As is seen, sensors/receivers 310 are disposed along N rows and M columns. The local oscillator (LO) signal 360 is shown as being delivered to sensors 310 using planar waveguides. As was described above, in some embodiments, array 350 may be an array of transmitting elements adapted to transmit signals.

Figure 5:
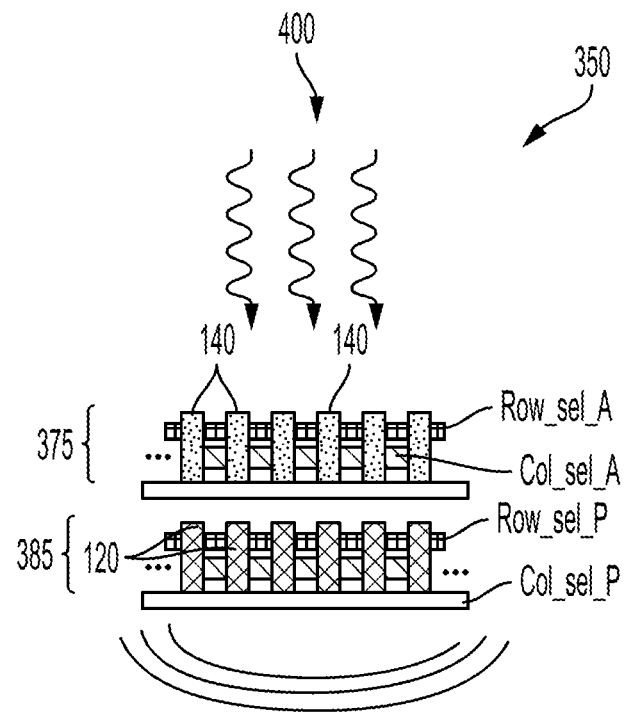
FIG. 5 is a cross-sectional view of a photonic device having an array of capacitive phase modulators and amplitude modulators arranged along rows and columns, in accordance with one embodiment of the present invention.

FIG. 5 is a side view of a photonic device 350, in accordance with another exemplary embodiment of the present invention. Photonic device 350, which may be a phased array, is shown as including an array 375 of amplitude modulators 140 each adapted to modulate the amplitude of the optical signal 40 received by device 350. Array 375 may be a one-dimensional, two-dimensional or a three dimensional array.

Each amplitude modulator may be selected via a column and row address select signal. Only one row select signal Row_Sel_A and one column select signal Col_Sel_A are shown in FIG. 5. The amplitude modulators may operate in accordance with the FranzKeldysh effect and formed using electro-absorption modulators, liquid crystals, and the like.

The amplitude modulated signals are delivered to array 385 of phase modulators 120 each adapted to modulate the phase of an amplitude modulate signal received from an associated amplitude modulator 140. Array 380 may be a one-dimensional, two-dimensional or a three dimensional array. Each phase modulator may be selected via a column and row address select signal. Only one row select signal Row_Sel_P and one column select signal Col_Sel_P are shown in FIG. 5. Each phase modulator 120 may correspond to a capacitive phase modulator as shown in FIGS. 1 and 2.

The use of both amplitude and phase modulation, as shown in FIG. 5, enable the formation of a relatively large, scalable aperture which can be used for holographic imaging and holographic generation. By electrically adjusting the amplitude and phase of each amplitude and phase cell, it is possible to dynamically reconfigure the array for the realization of holographic display.

Figure 6:
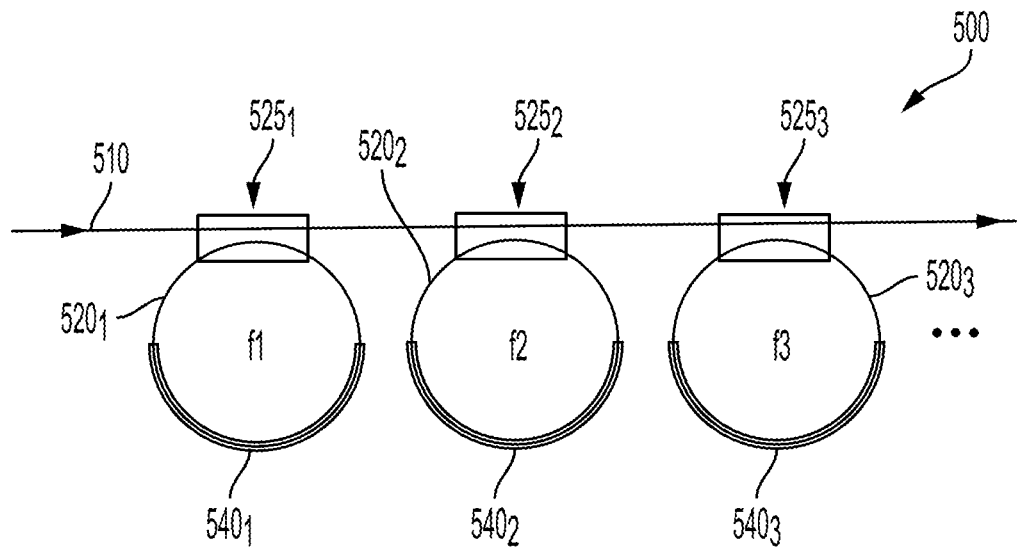
FIG. 6 is a simplified high-level view of a data modulator, in accordance with another exemplary embodiment of the present invention.

FIG. 6 is a simplified high-level view of a data modulator 500, in accordance with another exemplary embodiment of the present invention. Data modulator 500 is shown as including, in part, N high-Q ring resonators $520_1$, $520_2$ ... $520_N$. Each ring resonator $520_i$, where i is an index ranging from 1 to N, includes a capacitive phase modulator $540_i$ each of which corresponds to a capacitive phase modulator 50 or capacitive phase modulator 60, as described above with reference to FIGS. 1 and 2. The optical signal travelling through waveguide 510 is coupled to the ring resonators nearly at positions $525_1$, $525_2$ ... $525_N$. The resonance wavelengths of the modulators are adjusted using the capacitive phase modulators which consume nearly no static DC power. The high-Q of the rings reduces the drive voltage required for the data modulation and as a result, the combined system modulates data with a very high efficiency. In one embodiment, the ring resonators $520_1$, $520_2$ ... $520_N$ are tuned at different frequencies to operate as a WDM system. In other embodiment, the rings resonators $520_1$, $520_2$ ... $520_N$ are coupled together serially or in parallel to achieve a particular filter response.

The above embodiments of the present invention are illustrative and not limitative. Other additions, subtractions or modifications are obvious in view of the present disclosure and are intended to fall within the scope of the appended claims.

What is claimed is:

1. An optical phased array comprising:
   a plurality of optical signal transmitting elements; and
   a plurality of phase modulators, each phase modulator comprising:
   a p-type semiconductor region;
   an n-type semiconductor region; and
   a $\chi^{(2)}$ insulating dielectric material disposed between the p-type and n-type semiconductor regions, wherein each of the plurality of phase modulators is associated with a different one of the plurality of optical signal transmitting elements.

2. The optical phased array of claim 1 wherein the said $\chi^{(2)}$ insulating dielectric material is an organic polymer.

3. The optical phased array of claim 1 further comprising a plurality of sensors each associated with a different one of the plurality of phase modulators and adapted to receive a phase modulated signal generated by the associated phase modulator.

4. The optical phased array of claim 3 further comprising a plurality of amplitude modulators each associated with a different one of the plurality of phase modulators.

5. The optical phased array of claim 4 wherein said plurality of phase modulators form an array.

6. The optical phased array of claim 5 wherein said array is one of one-dimensional or two-dimensional arrays.

7. An electro-optical device comprising a plurality of phase modulators, each phase modulator comprising:
   a p-type semiconductor region;
   an n-type semiconductor region; and
   a undoped semiconductor region disposed between the n-type and p-type semiconductor regions; and
   a $\chi^{(2)}$ insulating dielectric material overlying the undoped semiconductor region and extending above the p-type and n-type semiconductor regions.

8. The electro-optical device of claim 7 wherein the said x'2 insulating dielectric material is an organic polymer.

9. The electro-optical device of claim 7 wherein said electro-optical device is a phased array, and wherein each phase modulator is associated with a different one of a plurality of transmitting elements of the phased array.

10. The electro-optical device of claim 7 further comprising a plurality of sensors each associated with a different one of the plurality of phase modulators and adapted to receive a phase modulated signal generated by the associated phase modulator.

11. The electro-optical device of claim 10 further comprising a plurality of amplitude modulators each associated with a different one of the plurality of phase modulators.

12. The electro-optical device of claim 11 wherein said plurality of phase modulators form an array.

13. The electro-optical device of claim 12 wherein said array is one of one-dimensional or two-dimensional arrays.

* * * * *